W. N. C. WILLSON.
POULTRY FETTER.
APPLICATION FILED JUNE 15, 1917.

1,240,111.

Patented Sept. 11, 1917.

Witness

Inventor
W. N. C. Willson
By
Attorney

UNITED STATES PATENT OFFICE.

WILLIAM N. C. WILLSON, OF BERRYVILLE, VIRGINIA.

POULTRY-FETTER.

1,240,111.  Specification of Letters Patent.  Patented Sept. 11, 1917.

Application filed June 15, 1917. Serial No. 174,970.

*To all whom it may concern:*

Be it known that I, WILLIAM N. C. WILLSON, a citizen of the United States, residing at Berryville, in the county of Clarke and State of Virginia, have invented certain new and useful Improvements in Poultry-Fetters; and I do declare the following to be a full, clear, and exact description of the invention, such as will enable others skilled in the art to which it appertains to make and use the same.

My invention has for its principal object to provide an extremely simple and inexpensive, yet a highly efficient and durable device for preventing poultry from flying over fences and destroying growing plants and seeds.

A further object is to provide a device which will be applicable to fowls of different sizes.

Yet another object is to so construct a fetter that it may be used to prevent the breeding and accumulation of mites and other vermin under the fowl's wings.

With the foregoing general objects in view, the invention resides in the novel features of construction to be hereinafter fully described and claimed, the descriptive matter being supplemented by the accompanying drawing which forms a part of this specification and in which:

Figure 1:
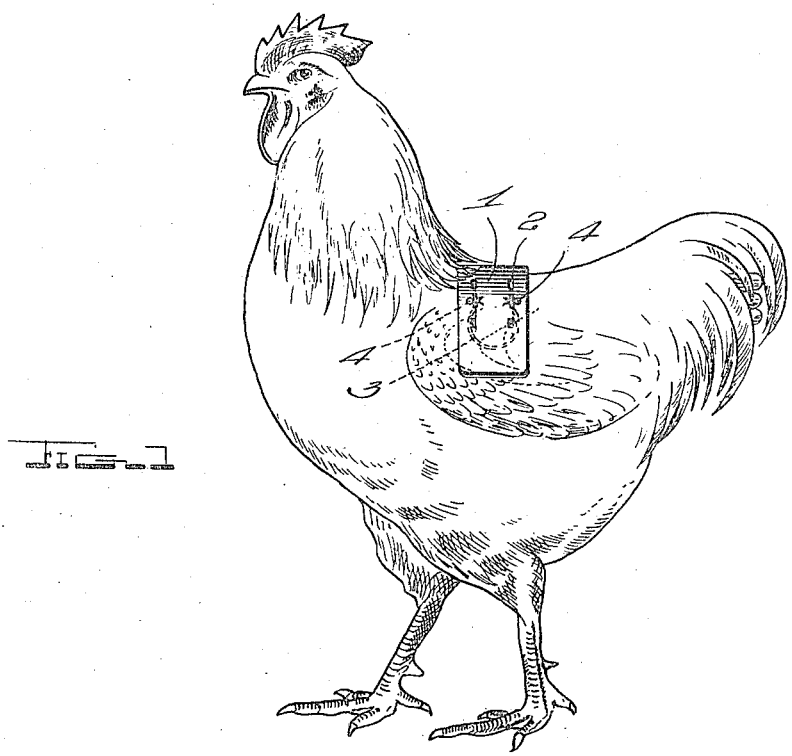
Figure 1 is a side elevation of the invention applied.
Figure 2:
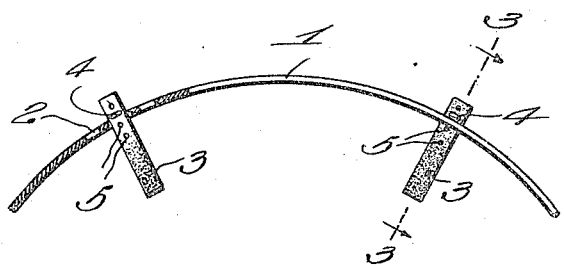
Fig. 2 is an edge view partly broken away and in section.
Figure 3:
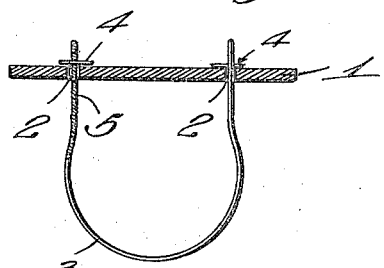
Fig. 3 is a transverse section of Fig. 2 on the plane of the line 3—3 thereof.

In the drawing above briefly described, the numeral 1 designates a flat strip of wood or other suitable material curved longitudinally into arch shape and adapted to extend across the fowl's back in the form of a saddle as shown in Fig. 1. The ends of the saddle 1 are formed with longitudinal slots or other suitable openings 2 which may be spaced longitudinally thereof along both edges as shown in Fig. 2.

The slots 2 receive therein straps 3 which are adapted to surround the upper portion of the wing bone as shown in dotted lines in Fig. 1, and although any preferred means could be employed for securing said straps in place, cotter pins 4 preferably pass through the ends of said straps and rest on the outer side of the saddle 1, one or both ends of each strap preferably having a plurality of openings 5 through any one of which the cotter pin thereof may be passed.

By providing a plurality of slots 2 spaced longitudinally of the saddle 1, and a number of openings 5, the device may readily be used on fowls of different sizes. When applying the improved fetter, the chickens are caught while roosting and the straps 3 passed around the wing bones after first positioning the saddle 1 across the back. The device may be snugly fitted by inserting the straps in the proper slots 2 and by drawing said straps to the required extent before inserting the cotter pins 4. The straps are preferably formed of non-hardening leather which prevents chafing and at the same time is sufficiently tough to prevent the fowls from breaking the straps by pecking the same. These straps are preferably well greased before applied and thus serve as an effective means for supplying such grease under the wings so as to destroy vermin and prevent further breeding or accumulation thereof.

The device is not only of extremely simple and inexpensive construction, but is highly efficient and durable, and since probably the best results are obtained from the specific construction shown, such construction constitutes the preferred form of the improved fetter. I wish it understood, however, that within the scope of the invention as claimed, numerous minor changes may be made without sacrificing the principal advantages.

I claim:—

1. A poultry fetter comprising an arched saddle to extend over the fowl's back and means for securing the ends of the saddle to the wing bones to prevent flying.

2. A poultry fetter comprising an arched saddle to extend over the fowl's back, and straps for securing the ends of said saddle to the wing bones to prevent flying.

3. A poultry fetter comprising an arched saddle to extend over the fowl's back, the ends of said saddle having openings, and U-shaped straps whose ends pass through said openings, said straps being adapted for passage around the wing bones to prevent flying, and means for securing the ends of said straps against withdrawal from said openings.

4. A poultry fetter comprising a saddle curved longitudinally into arch shape for passage over the fowl's back, the ends of said saddle having longitudinally spaced openings along their edges, and U-shaped straps whose ends are insertible through said openings, said ends of the straps having openings, and fasteners passing through said last named openings, said straps being adapted for passage around the wing bones to prevent flying.

In testimony whereof I have hereunto set my hand in the presence of two subscribing witnesses.

WILLIAM N. C. WILLSON.

Witnesses:
EDWIN T. SNIDER,
J. FEW BROWN.

Copies of this patent may be obtained for five cents each, by addressing the "Commissioner of Patents, Washington, D. C."